Dec. 26, 1933.  M. E. BOYER  1,940,740

COOKING UTENSIL

Filed April 6, 1933

Mabel E. Boyer
Inventor

By C.A.Snow&Co.
Attorneys.

Patented Dec. 26, 1933

1,940,740

UNITED STATES PATENT OFFICE 1,940,740

COOKING UTENSIL

Mabel Edith Boyer, Detroit, Mich.

Application April 6, 1933. Serial No. 664,799

2 Claims. (Cl. 53—1)

This invention relates to cooking utensils, and more particularly to utensils designed primarily for use in boiling foods such as vegetables, spaghetti, or the like.

The primary object of the invention is to provide a cooking utensil of this character including an inner wire basket for containing the material being cooked, to the end that the water will be drained from the articles when the basket is lifted and removed from the outer receptacle of the cooker.

Another object of the invention is to provide a cover for the receptacle, carried by the basket, the cover securing means being such that the cover may be readily removed from the wire basket, to permit the utensil to be washed and cleaned with facility.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
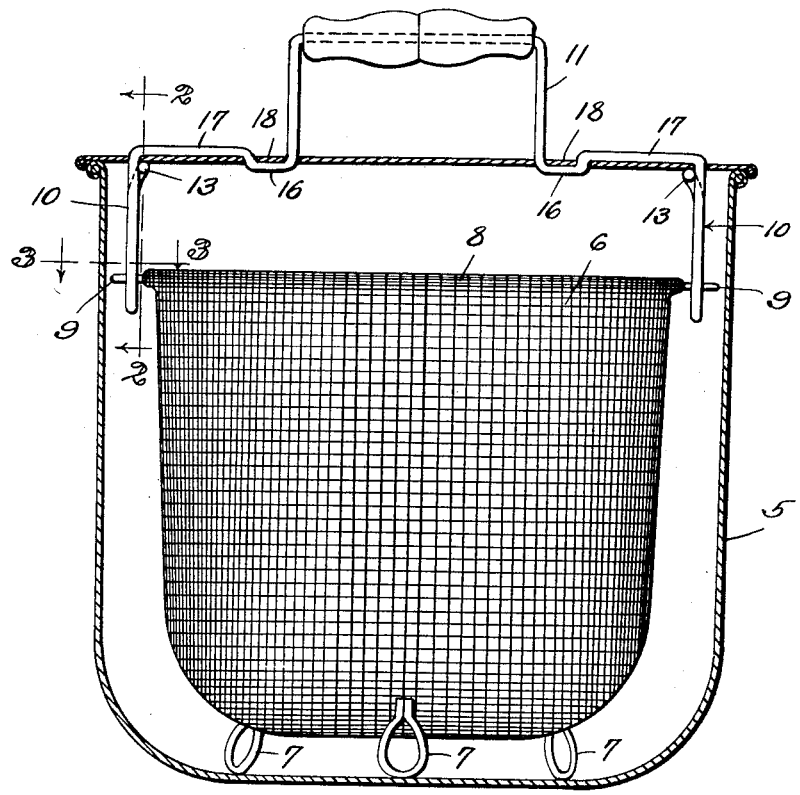
Figure 1 is a vertical sectional view through a cooking utensil constructed in accordance with the invention.
Figure 2:
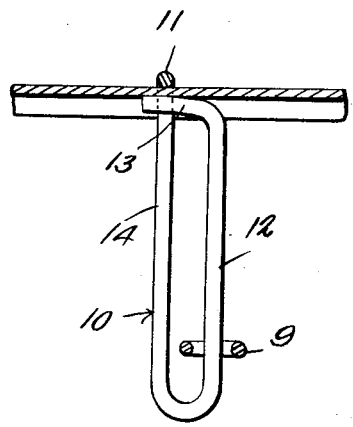
Figure 2 is a sectional view taken on line 2—2 of Figure 1.
Figure 3:
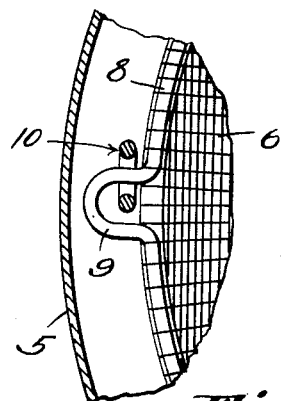
Figure 3 is a sectional view taken on line 3—3 of Figure 1.

Referring to the drawing in detail, the reference character 5 designates the outer receptacle of the cooking utensil which may be in the form of a pot, kettle or pan.

The reference character 6 designates the inner section of the cooking utensil, and comprises a wire basket, of a construction to fit within the outer receptacle in such a way that the top of the wire basket is spaced an appreciable distance from the top of the outer receptacle.

The wire basket is held in spaced relation with the outer receptacle by means of the feet 7, that are formed on the bottom of the wire basket as clearly shown by the drawing.

At the top of the wire basket, is a ring member 8, to which the wire mesh material of the basket is secured, the ring member being provided with offset portions 9, disposed on opposite sides thereof. These offset portions 9 provide eyes to be engaged by the cover securing members 10 that are formed at the ends of the length of wire constituting the handle 11, the cover securing members 10 including arms 12 that have inwardly extended end portions 13 engaging the straight portions 14 of the cover securing members 10, securing the cover securing members 10, within the eyes or offset portions 9.

Thus it will be seen that due to this construction the cover securing members will permit of sliding movement of the cover 15, with respect to the wire basket, so that the cover 15 may be moved away from the wire basket to permit material cooked in the utensil, to be emptied therefrom.

As clearly shown by the drawing, the length of wire of which the handle is formed, is bent to provide an offset portion 16 and laterally extended arms 17, the offset portion 16 passing under the stamped out sections 18 of the cover, from where the wire material passes through openings in the cover, to the opposite side of the cover.

Should it be desired to remove the cover from the wire basket, it is only necessary to move the movable arms 12 to disengage the portions 14, whereupon the cover securing members may be readily removed from the offset portions 9 of the ring member 8, to facilitate the cleaning of the wire basket.

It will further be seen that due to this construction, the portions 13 of the cover securing members, cooperate with the arms 17 in clamping the cover to the handle.

Having thus described the invention what is claimed is:

1. A cooking utensil comprising an outer vessel and an inner member, a cover for the utensil, a cover securing member comprising a length of wire secured to the cover, portions of the length of wire extending downwardly and upwardly, the upwardly extended portions providing yieldable arms, the ends of the yieldable arms extending laterally and closely engaging the cover and downwardly extended portions of the arms securing the cover to the inner member, and said upwardly extended portions adapted to be moved laterally out of contact with the downwardly extended portions, releasing the cover securing members from the inner member.

2. A cooking utensil comprising an outer vessel and an inner removable container constructed of foraminous material, said container having eyes formed at opposite sides thereof, a cover for the utensil, a handle for the cover, means for pivotally connecting the cover to the handle, the ends of the handle extending an appreciable distance beyond the bottom of the cover and formed into loops, and said loops embodying pivoted sections permitting the loops to open, to disconnect the cover from the utensil.

MABEL EDITH BOYER.